(12) United States Patent
Shivarathri

(10) Patent No.: US 11,657,047 B1
(45) Date of Patent: May 23, 2023

(54) AUTOMATED QUERY TUNING METHOD, COMPUTER PROGRAM PRODUCT, AND SYSTEM FOR MPP DATABASE PLATFORM

(71) Applicant: Giri Babu Shivarathri, Issaquah, WA (US)

(72) Inventor: Giri Babu Shivarathri, Issaquah, WA (US)

( * ) Notice: Subject to any disclaimer, the term of this patent is extended or adjusted under 35 U.S.C. 154(b) by 22 days.

(21) Appl. No.: 16/913,822

(22) Filed: Jun. 26, 2020

Related U.S. Application Data

(60) Provisional application No. 62/867,076, filed on Jun. 26, 2019.

(51) Int. Cl.

| | | |
|---|---|---|
| G06F 16/2453 | (2019.01) | |
| G06F 16/2455 | (2019.01) | |
| G06F 11/30 | (2006.01) | |
| G06F 16/17 | (2019.01) | |
| G06F 11/34 | (2006.01) | |
| G06F 16/28 | (2019.01) | |

(52) U.S. Cl.
CPC .... *G06F 16/24532* (2019.01); *G06F 11/3072* (2013.01); *G06F 11/3409* (2013.01); *G06F 16/1734* (2019.01); *G06F 16/24557* (2019.01); *G06F 16/289* (2019.01)

(58) Field of Classification Search
CPC ........... G06F 16/24532; G06F 11/3072; G06F 11/3409; G06F 16/1734; G06F 16/24557; G06F 16/289; G06F 11/3428; G06F 11/3433; G06F 11/3452; G06F 11/3476; G06F 16/24534
See application file for complete search history.

(56) References Cited

U.S. PATENT DOCUMENTS

| | | | | |
|---|---|---|---|---|
| 5,671,403 | A  * | 9/1997 | Shekita | ............ G06F 16/24537 |
| 2004/0167873 | A1 * | 8/2004 | Dettinger | .............. G06F 16/284 |
| 2005/0049999 | A1 * | 3/2005 | Birn | ..................... G06F 11/3636 |
| | | | | 707/999.009 |
| 2005/0165741 | A1 * | 7/2005 | Gordon | ............. G06F 16/24542 |
| 2010/0198810 | A1 * | 8/2010 | Graefe | ............. G06F 16/24542 |
| | | | | 707/718 |
| 2011/0282847 | A1 * | 11/2011 | Collins | ............... G06F 16/2455 |
| | | | | 707/688 |

(Continued)

OTHER PUBLICATIONS

Iszo et al., "Towards precise metrics for predicting graph query performance" ASE'13: Proceedings of the 28th IEEE/ACM International Conference on Automated Software Engineering Nov. 2013 pp. 421-431 teaches (Year: 2013).*

*Primary Examiner* — Mark D Featherstone
*Assistant Examiner* — Kweku William Halm
(74) *Attorney, Agent, or Firm* — Plager Schack LLP; Mark H. Plager; Alexis J. Saenz

(57) ABSTRACT

A method if improving the performance of any SQL query in a Massively Parallel Processing (MPP) database platform replicates a query and breaks the query down into its objects so that iterations of the query components may be analyzed for areas affecting performance. The method builds the query from the lowest part of the query (for example, a single database object may be used in the query) and rebuilds the query by iteratively adding more objects along with their related logic (joins, group by clause, select list, etc.). In each iteration, the process analyzes for the underlying causes of lower performance and fixes them.

18 Claims, 11 Drawing Sheets

(56) References Cited

U.S. PATENT DOCUMENTS

| | | | | |
|---|---|---|---|---|
| 2014/0181079 A1* | 6/2014 | Ghazal | ............. | G06F 16/24535 |
| | | | | 707/718 |
| 2014/0310260 A1* | 10/2014 | Wu | ...................... | G06F 16/245 |
| | | | | 707/718 |
| 2016/0274990 A1* | 9/2016 | Addleman | .......... | G06F 11/3452 |
| 2016/0283362 A1* | 9/2016 | Seto | ................... | G06F 16/2455 |

* cited by examiner

Original SQL query

Select biltran.transaction_id, arsl.sub_ledger_no, biltran.transaction_amount, biltran.total_quantity, Adrs.address_group
From trandb.billing_transaction_v biltran
inner join trandb.ar_ledger_v arsl
　　On biltran.ar_ledger_no = arsl.ar_ledger_no
　　And biltran.transaction_date = arsl. ledger_date
Inner join trandb.address_master_v adrs
　　On biltran.transaction_location_id = adrs.location_id
join trandb.fiscal_calender_v fcal
　　On biltran.transaction_date between fcal.fiscal_month_start_date and fcal.fiscal_month_end_date
where fcal.fiscal_date = current_date;

Re-pointed SQL query

Select biltran.transaction_id, arsl.sub_ledger_no, biltran.transaction_amount, biltran.total_quantity, Adrs.address_group
From sandboxdb.billing_transaction_v biltran
inner join sandboxdb.ar_ledger_v arsl
　　On biltran.ar_ledger_no = arsl.ar_ledger_no
　　And biltran.transaction_date = arsl. ledger_date
Inner join sandboxdb.address_master_v adrs
　　On biltran.transaction_location_id = adrs.location_id
join sandboxdb.fiscal_calender_v fcal
　　On biltran.transaction_date between fcal.fiscal_month_start_date and fcal.fiscal_month_end_date
where fcal.fiscal_date = current_date;

*FIG. 4*

| billing_transaction |
|---|
| transaction_id |
| transaction_amount |
| total_quantity |
| ar_ledger_no |
| transaction_location_id |
| transaction_date |
FIG. 5
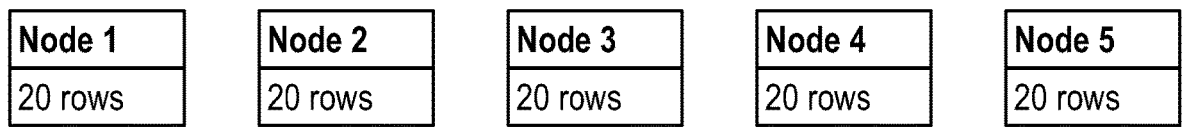
FIG. 6
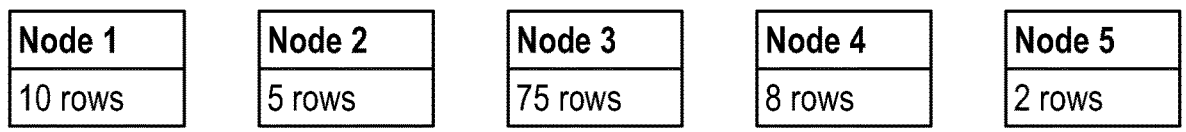
FIG. 7

| billing_transaction |
|---|
| Row1 |
| Row 2 |
| Row 3 |
| - |
| - |
| - |
| - |
| Row 100 Million |

} All Rows Scanned

*FIG. 8*

| billing_transaction |
|---|
| Partition 1 |
| • Row 2 |
| • Row 3 |
| Partition 1 |
| • Row 3 |
| • Row 4 |
| - |
| - |
| Partition n |
| • Row x |
| • Row 100 million |

} Only One Partition Accessed

*FIG. 9*

```
Select biltran.transaction_id, arsl.sub_ledger_no, biltran.transaction_amount, biltran.total_quantity,
Adrs.address_group
From trandb.billing_transaction_v biltran
inner join trandb.ar_ledger_v arsl
    On biltran.ar_ledger_no = arsl.ar_ledger_no     ⎫  ← (Access)
    And biltran.transaction_date = arsl. ledger_date ⎭
Inner join trandb.address_master_v adrs
    On biltran.transaction_location_id = adrs.location_id  ← (Access)
join trandb.fiscal_calender_v   fcal
    On biltran.transaction_date between fcal.fiscal_month_start_date and
    fcal.fiscal_month_end_date  ←
where fcal.fiscal_date = current_date;           (Access)
```

FIG. 10

Group 1

```
Select biltran.transaction_id, arsl.sub_ledger_no,
biltran.transaction_amount, biltran.total_quantity,
Adrs.address_group
From trandb.billing_transaction_v biltran
inner join trandb.ar_ledger_v arsl
    On biltran.ar_ledger_no = arsl.ar_ledger_no
    And biltran.transaction_date = arsl. ledger_date
join trandb.fiscal_calender_v   fcal
    On biltran.transaction_date between
    fcal.fiscal_month_start_date and fcal.fiscal_month_end_date
```

FIG. 11

Group 2

```
Select address_group,
location_id

From
trandb.address_master_v
```

FIG. 12

```
Select arbiltran.transaction_id, arbiltran.sub_ledger_no, arbiltran.transaction_amount,
arbiltran.total_quantity, Adrs.address_group
From
(Select biltran.transaction_id, arsl.sub_ledger_no, biltran.transaction_amount, biltran.total_quantity,
From trandb.billing_transaction_v biltran
Inner join trandb.ar_ledger_v arsl
        On biltran.ar_ledger_no=arsl.ar_ledger_no
        And biltran.transaction_date = arsl.ledger_date
Join trandb.fiscal_calendar_v  fcal
        On biltran.transaction_date between fca.fiscal_month_strat_date and
        fcal.fiscal_month_end_date
Where fcal.fiscal_date = current_date) arbiltran
Inner join (Select address_group, location_id From trandb.address_master_v ) adrs
        on arbiltran.transaction_location_id=adrs.location_id
```

FIG. 13

AUTOMATED QUERY TUNING METHOD, COMPUTER PROGRAM PRODUCT, AND SYSTEM FOR MPP DATABASE PLATFORM

CROSS-REFERENCE TO RELATED APPLICATIONS

This application claims benefit under 35 U.S.C. § 119(e) of U.S. Provisional Application having No. 62/867,076 filed Jun. 26, 2019, which is hereby incorporated by reference herein in its entirety.

BACKGROUND

The embodiments herein relate generally to data processing, and more particularly to, a method for performance tuning of queries on any Massively Parallel Processing (MPP) database platform.

MPP database platforms continuously evolve to provide faster data processing speeds, better query optimization, etc. However, due to many reasons, a significant number of queries developed/written do not perform optimally. Database Administrators (DBAs) and/or performance tuning personnel constantly have to keep identifying poorly performing queries and performance tune them.

Specifically, the invention relates to a methodology followed to get poorly performing queries on any given MPP database platform to perform as optimally as they can. Measurement of query's performance is based on system resource utilization of any MPP database platforms. System resources include CPU time, Number of Input Output (IO) operations, Memory utilized and time consumed. Current most prominent MPP database platforms are Teradata & Hadoop. MPP database platforms differ from non MPP database platforms (Example: Oracle, Microsoft SQL Server etc.) in many aspects including but not limited to system architecture, data distribution and storage, data processing, performance tuning etc.

Embodiments of the subject technology address these problems.

SUMMARY

In one aspect, method of improving the performance of an SQL query statement in a database platform id disclosed. The method comprises: receiving the SQL query statement; parsing the received SQL query statement into query elements; extracting individual query elements from the parsed query elements; selecting a base one or more of the extracted individual query elements; building a query under test from the selected one or more individual query elements; successively adding one or more of the individual query elements to the query under test in iterations; and testing the query under test for a query performance metric after each iteration until one of the iterations shows a satisfactory improvement in the query performance metric.

In another aspect, a computer program product for improving the performance of an SQL query statement in a database platform is disclosed. The computer program product comprises a non-transitory computer readable storage medium having computer readable program code embodied therewith. The computer readable program code being configured, when executed by a computer processor, to: receive the SQL query statement; parse the received SQL query statement into query elements; extract individual query elements from the parsed query elements; select a base one or more of the extracted individual query elements; build a query under test from the selected one or more individual query elements; successively add one or more of the individual query elements to the query under test in iterations; and test the query under test for a query performance metric after each iteration until one of the iterations shows a satisfactory improvement in the query performance metric.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE FIGURES

The detailed description of some embodiments of the invention is made below with reference to the accompanying figures, wherein like numerals represent corresponding parts of the figures.

FIG. 4 is a diagrammatic view of an example for query re-pointing in accordance with embodiments.

FIG. 5 is a diagrammatic view of statistics collected by embodiments of the subject technology.

FIG. 6 is a diagrammatic view of an even data distribution scenario in accordance with an exemplary embodiment of the subject technology.

FIG. 7 is a diagrammatic view of a data skew scenario in accordance with an exemplary embodiment of the subject technology FIG. 8: Data distribution and Skew scenarios FIG. 8 is a diagrammatic view of a full table scan scenario in accordance with an exemplary embodiment of the subject technology.

FIG. 9 is a diagrammatic view of a partitioned table scan scenario in accordance with an exemplary embodiment of the subject technology.

FIG. 10 is a diagrammatic view of an alternate access pass to a table based on a sample query in accordance with an exemplary embodiment of the subject technology.

FIG. 11 is a diagrammatic view of a first part of an SQL query.

FIG. 12 is a diagrammatic view of a second part of an SQL query.

FIG. 13 is a diagrammatic view of a query result of a grouping function applied to the first part and to the second part of the SQL query of FIGS. 11 and 12.

DETAILED DESCRIPTION OF CERTAIN EMBODIMENTS

Figure 1A:
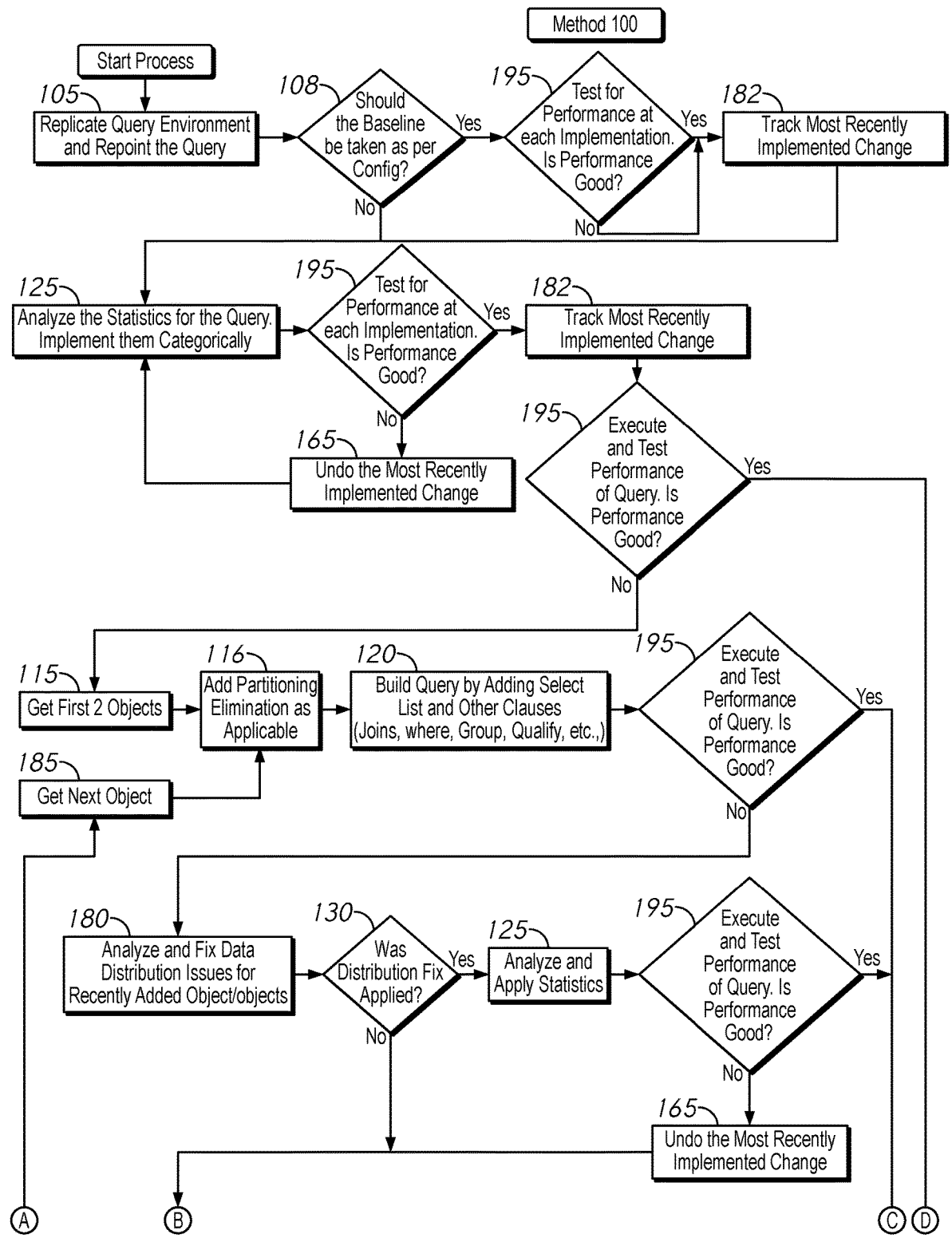
FIGS. 1A and 1B is a flowchart of a method of improving the performance of an SQL query in a Massively Parallel Processing (MPP) database platform in accordance with an exemplary embodiment of the subject technology.

In general, embodiments of the disclosed subject technology provide a method for improving the performance of any SQL query in a Massively Parallel Processing (MPP) database platform. The method builds the query from the lowest part of the query (for example, a single database object used in the query) and rebuilds the query by iteratively adding more objects along with their related logic (joins, group by clause, select list, etc.). In each iteration, the process analyzes for performance bottlenecks and fixes the underlying causes of sub-optimal performance.

Definitions

The following is a list of definitions for terms used throughout the disclosure.

SQL: SQL is an acronym for Structured Query Language. It is a standard language supported by all database platforms to work with the data.

SQL Query: An SQL query is a command which helps achieve any operation related data including defining data, manipulating data, see data, etc. SQL query is generally referred to as "query".

Subquery: A Subquery is defined as a query within a query.

SQL query Parsing: Parsing a query is to split each aspect of the query text and extract very detailed information of all aspects of the query.

MPP: MPP is an acronym for Massively Parallel Processing. Some database platforms are built based on this concept. Such database platforms are referred to as MPP database platforms.

Performance tuning: A process to optimize the query execution on the database platform. A performance tuning process basically identifies the inefficiencies in the SQL query and fix them to achieve optimal performance. This process is also commonly referred to as tuning a query or query tuning.

Query Performance: The efficiency with which a query executes is referred to as query performance. Efficiency of query execution is measured based on multiple factors (which could vary based on database platform) like CPU time, TO, memory used, data skew, time taken.

Poorly performing queries: Queries which do not perform optimally are referred to as poorly performing queries CPU time: Amount of CPU time consumed is referred to as CPU time.

Data distribution: Distributing the data across all the database platform processing servers (also called as nodes). Fundamental concept of MPP database platform is to process data parallelly. Data is processed parallelly if it is distributed across all the processing nodes evenly.

Database objects: Any object created in a database is a database object. Examples of database objects are tables, views, indices, etc.

Object statistics: Statistics is a way to collect information on the database objects which host data. Many kinds of information are collected. For example: number of unique values in a column, total number of rows, etc.

Tuning techniques: A technique applied to fix an inefficiency identified by the performance tuning process. Example: Change the distribution of the data in the table. Split the query into 2 parts and materialize one/both of the part, etc.

Skew: MPP database platforms depend on parallel processing of data. If the data is not distributed evenly across all processing nodes, then some nodes have to process more data than others. This scenario is referred to as skewed processing.

Partition elimination: Table and indices which host huge data sets are generally partitioned. The intent of partitioning is to ensure only the required partitions are accessed to extract data instead of scanning through all rows in a huge table. This functionality of scanning required partitions to extract by eliminating other partitions is called partition elimination.

Access path: Access path to a database object is column or collection of columns used to join to the table or query the table.

Performance numbers: Efficiency of query execution is measured based on multiple factors (which could vary based on database platform) like CPU time, TO, memory used, data Skew, time taken. CPU time, TO, memory used, data Skew, time taken are referred to as performance numbers.

Database logs: A collection of all queries which are executed on the database platform is referred to as database logs. Many aspects of the queries are captured in the database logs like SQL text, explain plan, objects in the query, performance numbers, etc. Database logs are also referred to as Database query logs or query logs.

Lineage: Lineage is a trace of dependencies and transformations applied on an object or a column of an object. Lineage can be of 2 types—Column lineage and object lineage.

Database optimizer: A software process whose primary role is to generate optimal execution plans to execute the queries.

Explain plan: A step by step plan generated by the database optimizer to process data to execute a query is referred to as explain plan.

Sandbox environment: An isolated database where performance tuning can be performed.

DDL: As an acronym for Data Definition Language. DDL is a set of SQL commands which aim at changing the structure of any database object. Example: Adding a new column to an existing table, creating a new table or view or index etc.

Index: An index is a data structure which is used to quickly locate and access the data in a database table.

Static values: A physical value provided which does not change is referred to as static value. Example: a date value—'01-01-2019', a string value—'Channel', a number value—100.

Repository: A set of database tables designed to host various aspects of the performance tuning process including but not limited to: Query to be tuned, parsing output, object and column lineage, execution log along with performance numbers at each execution, etc.

In a general embodiment, a method of performance tuning a SQL query on a MPP database platform may include the following steps:

Replicating the SQL query environment;
Extract required object statistics and collect them as needed;
Ensure data is properly distributed in all database objects involved;
Analyze and identify data skew scenarios and implement tuning techniques to reduce the skew;

Validate that partition elimination is achieved as applicable in most optimal way;

Identify alternate access path requirements and implement tuning techniques to optimize them;

Ensuring appropriate materialization is implemented; and

At every stage of the tuning process validate the performance numbers and decide if further analysis and changes are needed to tune the SQL query;

Each step will be described in detail in later sections of this disclosure. Many of the steps mentioned above can be very complex and tedious to perform manually. For example, the following steps need to be performed for alternate access path analysis for one database table.

Step 1: Identify all views dependent on the given database table.

Step 2: From the database logs, extract all queries executed involving any of the identified views or the table itself. From this list of queries, extract the unique queries. From this list of queries, extract the unique queries.

Step 3: For each query, identify which object/objects used in the query from list of objects identified in above step.

Step 4: For the objects identified in above step, extract the columns of the object used in joins in the SQL query. While extracting the columns, for each column identified, extract the column's lineage (from the object to the given table). The lineage is used to identify any manipulations done on the column (including renaming of column).

Step 5: Track the combinations of columns identified in above step and also count the number of occurrences of each combination.

Step 6: repeat Step 3 to Step 5 for each query identified.

The result of Step 6 will be a list of all possible access paths for the given object.

Doing the above-mentioned tasks may be so tedious that it is almost never done thoroughly.

As will be appreciated, aspects of the method(s) disclosed herein automate tasks involved in performance tuning any given SQL query on any given MPP database platform.

In subject technology, complex analysis may be needed in the processes. To perform the analyses, some prerequisite information may be needed. Prerequisite information may include needing the history of queries along with information of the objects involved in the queries. The history of queries is generally referred to as query log. In some MPP database platforms, the server may be configured to collect and store details of every query executed on the database server along with many details like full query text, all objects involved in the query, performance numbers of the query execution, execution plan of the query, etc.

In some MPP platform systems, such a query log does not exist. On such database platforms, a custom query logging solution may be implemented according to an embodiment of the subject disclosure to track all details for queries executed on the server. Details collected on each system may be dependent on the platform itself. For example: on some platforms, an execution plan may not be collected.

Figure 2:
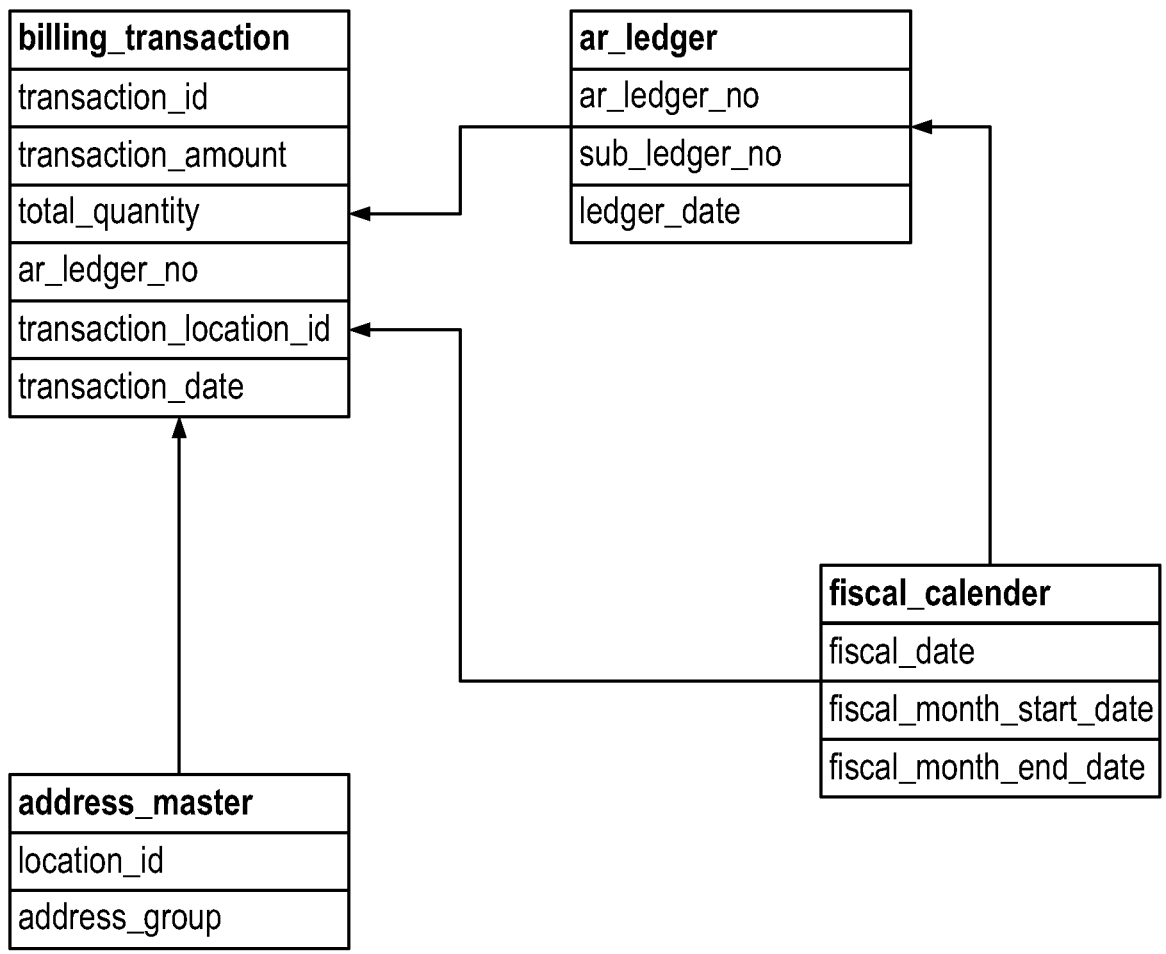
FIG. 2 is a data model for a reference query for an example reference query processed by embodiments of the subject technology.

For sake of illustration, a reference query scenario is shown in FIG. 2 which will be referred throughout the disclosure for help in explaining aspects of the subject technology. It should be understood that embodiments are not restricted to the reference query shown or tables they reference and are used for illustrative purposes only.

Reference Query 1:

Select biltran.transaction_id, arsl.sub_ledger_no, biltran.transaction_amount, biltran.total_quantity,
 Adrs.address_group
From trandb.billing_transaction_v biltran
Inner join trandb.ar_ledger_v arsl
On biltran.ar_ledger_no=arsl.ar_ledger_no
And biltran.transaction_date=arsl.ledger_date
Inner join trandb.address_master_v adrs
on biltran.transaction_location_id=adrs.location_id
Join trandb.fiscal_calendar_v fcal
On biltran.transaction_date between fcal.fiscal_month_start_date and fcal.fiscal_month_end_date
Where fcal.fiscal_date=current_date;

Overview of Objects Involved:

Transdb is the database schema where the objects in the query exist.

billing_transaction table contains transactions related to billing. Size of this table is 700 GB. This table is partitioned on transaction_date column.

billing_transaction table is distributed on transaction_id column.

billing_transaction_v is a 1:1 view on billing_transaction table. This view exposes all columns from the underlying table without any conditions or joins or any other logic.

ar_ledger table contains the accounts receivables information. Size of this table is 1 TB. This table is partitioned on ledger_date column.

ar_ledger table is distributed on ar_ledger_no column.

ar_ledger_v is 1:1 view on ar_ledger table. This view exposes all columns from the underlying table without any conditions or joins or any other logic.

address_master table master data for addresses. Size of this table is 500 GB.

Addres_master table is distributed on location_id column.

address_master_v is 1:1 view on table address_master. This view exposes all columns from the underlying table without any conditions or joins or any other logic.

fiscal_calendar table contains fiscal_calendar fiscal_calendar table is distributed on fiscal_date column.

fiscal_calendar_v is a 1:1 view on fiscal_calendar. This view exposes all columns from the underlying table without any conditions or joins or any other logic.

The join conditions between the tables show the join paths between the tables.

Table 1 shows a sample SQL query and its corresponding performance numbers when executed before performance tuning.

SQL query before performance tuning: Reference Query1

Performance numbers before tuning the query:

TABLE 1

| CPU | ImpactCPU | TotalIO | ImpactIO | CPU Skew | IO Skew | Memory Used | Time Taken |
|---|---|---|---|---|---|---|---|
| 50000 | 70000 | 800000 | 1000000 | 40 | 45 | 670000000 | 25 min |

Above performance numbers are high which indicates that the performance of the query is not good and needs to be tuned.

Table 2 shows performance numbers for the subject query when executed after performance tuning SQL query after performance tuning: Changes done to the query are underlined
  Select biltran.transaction_id, arsl.sub_ledger_no, biltran.transaction_amount, biltran.total_quantity,
    Adrs.address_group
    From trandb.billing_transaction_v biltran
    Inner join transb.ar_ledger_v arsl
    On biltran.ar_ledger_no=arsl.ar_ledger_no
    Inner join biltra.address_master_v adrs
    on biltran.transaction_location_id=adrs.location_id
    Join biltran.fiscal_calendar_v fcal
    On biltran.transaction_date between fcal.fiscal_month_start_date and fcal.fiscal_month_end_date
    And arsl.ledger_date between fcal.fiscal_month_start_date and fcal.fiscal_month_end_date
    Where fcal.fiscal_date=current_date;
  Performance numbers After tuning the query:

TABLE 2

| CPU | ImpactCPU | TotalIO | ImpactIO | CPU Skew | IO Skew | Memory Used | Time Taken |
|---|---|---|---|---|---|---|---|
| 20000 | 24000 | 500000 | 700000 | 2.5 | 3.5 | 400000 | 5 min 4 sec |

Figure 1B:
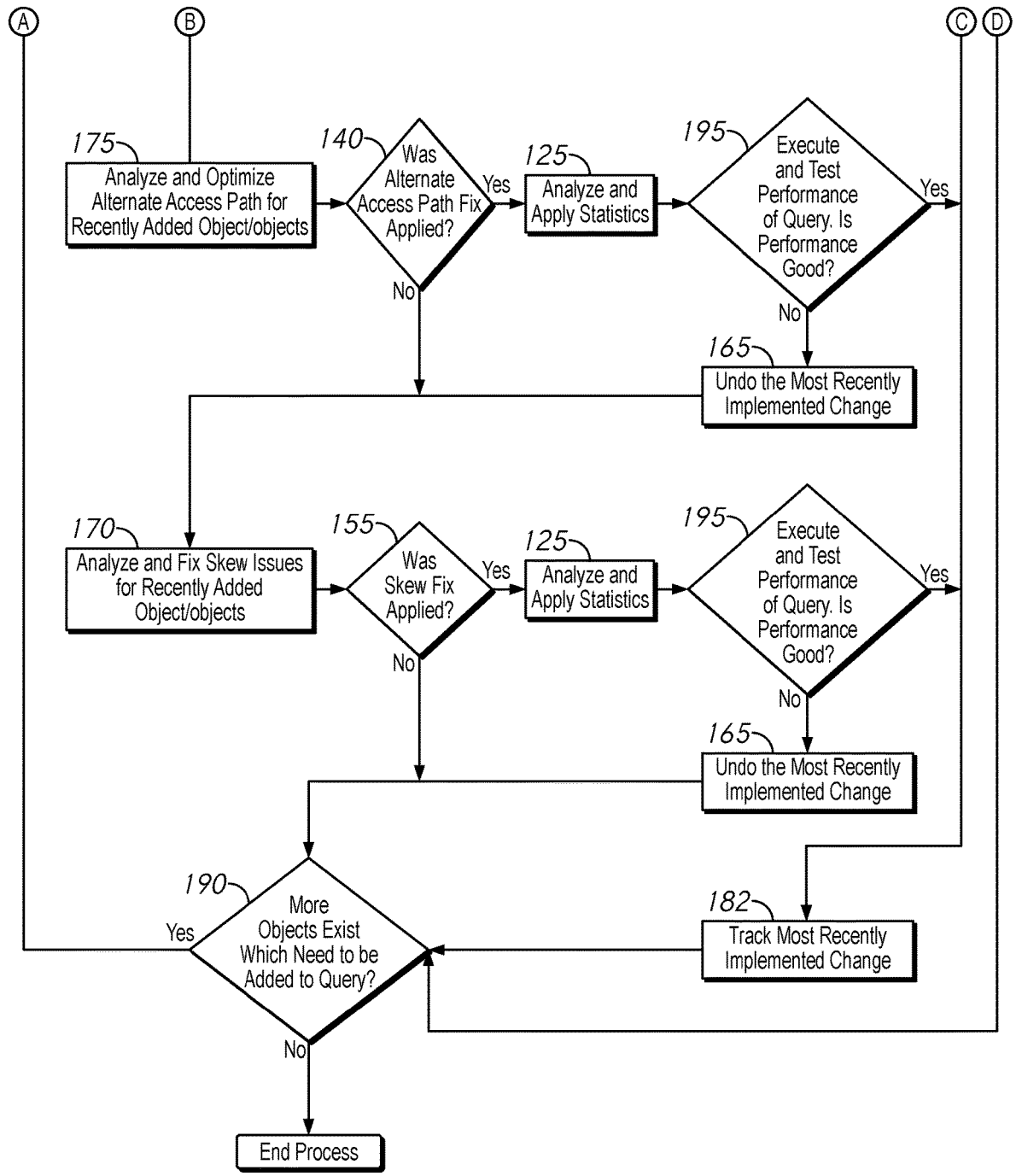

Referring now to FIG. 1, a method 100 of improving the performance of an SQL query in a Massively Parallel Processing (MPP) database platform is shown according to an exemplary embodiment. The method 100 contains many components which are explained further below in detail. These components are referred to where necessary for understanding in the sections that follow. In a general aspect of the method 100, it will be seen that after some steps and after iterations, a determination 195 may be performed. The determination 195 may evaluate whether the SQL query, in its current, is showing improved performance or otherwise sufficiently acceptable performance. FIG. 1 shows a determination 195 at six different stages, however it will be understood that more or less instances of the determination may be performed in different embodiments. When a tested query structure shows good (or passing) performance, the method may terminate. Otherwise, another step may be performed for analysis of performance or a successive iteration of a query structure may be analyzed.

In the description of FIG. 1, elements (or steps) which repeat a same or similar action may use the same reference number. Thus, for the sake of description, the blocks for statistical analysis 125, tracking changes 182, and determination 195 will not be referenced at each instance shown.

The method may include replicating 105 the SQL query environment. In this step, the method may extract the full query text of a subject query being processed for improvement by looking up the query log based on the query pointer information given. In this step, the subject query may be parsed for the following details of the query text may be extracted. (A detailed parsing example is shown in FIG. 4).
  objects (including sub queries)
  join conditions
  select list
  where conditions
  group by clauses
  qualify conditions
  combined queries
  type of query It will be understood that these are some examples of query text that may be analyzed and that others may be present and analyzed accordingly. Each text may represent a query object which may be used to construct a new partial form of the subject query (which may be referred to as a "query under test") being analyzed for performance. In an exemplary embodiment, the method 100 may build a query under test by starting from a base partial form of the subject query. A base partial form of the subject query may be any group of objects from the original subject query's extracted information which if arranged into a query with less objects than the original query. In an exemplary embodiment, query under test may be formed, analyzed for performance, and objects may be successively added to the query under test to form a new query under test, where each iteration of the query under test may be analyzed for performance.

For example, the method 100 may use the Objects extraction component to extract lineage of all involved objects in the query. In an embodiment, the first objects may be a minimum number of objects needed to form a functional query. Using a replication component (which may be seen in FIG. 4), the method 100 may replicate all the objects (used in the query and the lineage of objects identified) into a sandbox environment. The objects may represent different categories of operations/commands performed in the query. All aspects of the query get parsed (for example, select list, functions along with parameters used in functions, object aliases, column aliases, objects, joins conditions, where conditions, and qualify conditions. The parsed output is hosted in the repository.

Figure 16A:
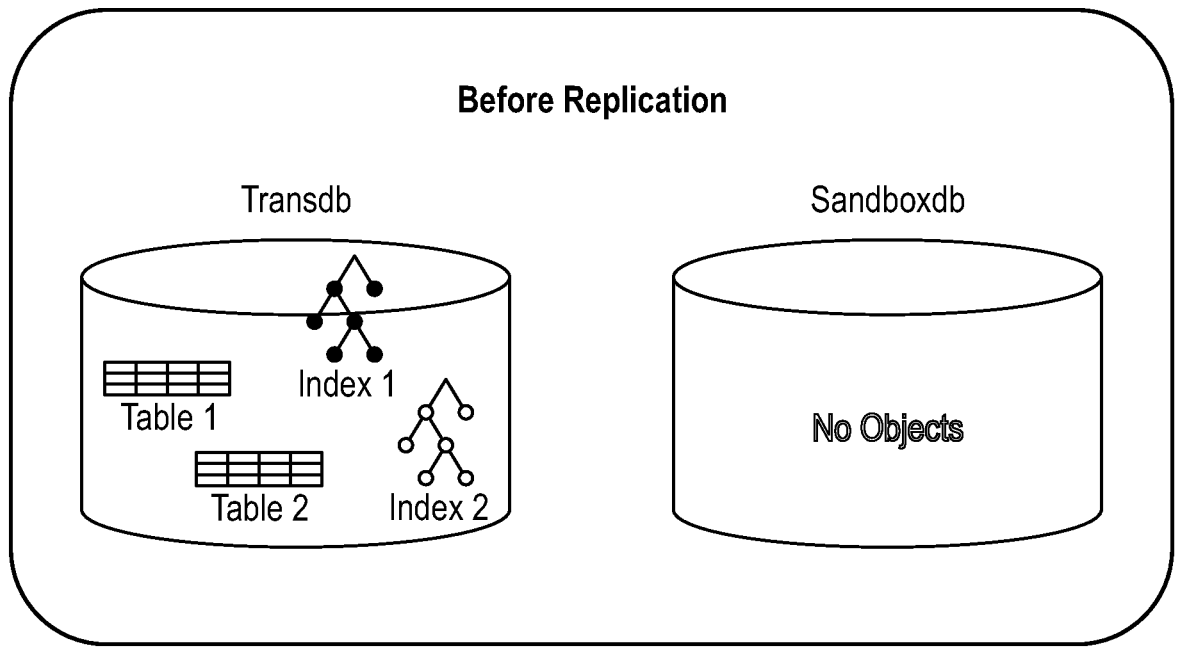
FIGS. 16A and 16B are diagrammatic views comparing databases before and after a replication process in accordance with embodiments of the subject technology
Figure 16B:
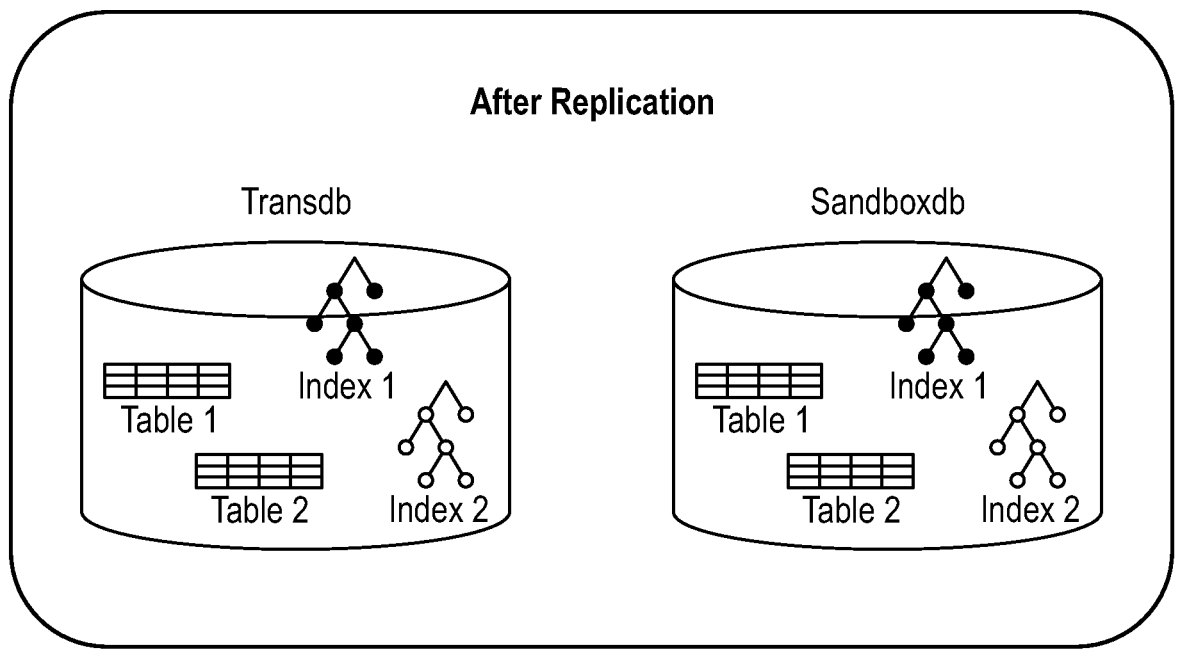

Re-point all objects in the SQL query (as show in FIG. 4) to the newly created ones through the replication component (block 105). A comparison of the transaction database and sandbox database before and after replication is shown in FIGS. 16A and 16B. This re-pointed query will act as the main query for remainder of this process.

If the user configuration indicates to take a baseline (block 108), execute the query SQL query using Execution and Track component (block 195) and validate the performance numbers. If the performance numbers are within the acceptable limits as given by the configuration then further analysis is not needed and the SQL query can be considered tuned. If the performance numbers are not within the acceptable limits as given by the configuration then further analysis is needed and the next steps should be executed.

Performance may be improved significantly by adding required statistics. Using (block 125) the Statistics component (as show in FIG. 5), extract the additional statistics needed for the SQL query. FIG. 5, shows statistics which may be collected on the table. Collect statistics syntax depends on the database platform. Each platform's syntax can be different from others. The same may apply to the type of statistics. The type of statistics (function statistics, partition statistics, index statistics, column statistics, etc.) are also database platform dependent. Some provide more options than others.

If any statistics were collected based on the output from Statistics component, execute the query SQL query using Execution and Track component and validate the performance numbers (block 195). If the performance numbers are within the acceptable limits as given by the configuration then further analysis is not needed and the SQL query can be considered tuned. If the performance numbers are not within the acceptable limits as given by the configuration then further analysis is needed and the next steps should be executed.

Example of Single Column Statistics:

Collect statistics on billing_transaction columns(transaction_id);

Example of Multi Column Statistics:

Collect statistics on billing_transaction columns(transaction_id,transaction_date);

Example of Function Statistics:

Collect statistics on billing_transaction columns(coalesce (total_quantity,0));

If the collected statistics have negatively impacted the performance, then undo the previous step by rolling back the statistics (block 165). If the collected statistics have positively impacted the query, then track (block 182) the collected statistics as a required step for tuning the SQL query.

If it is the first time this step is executed then extract the first 2 objects (block 115) in the SQL query. If not (as made in determination block 190), extract next object (block 185) joined in the SQL query. Build/rebuild the query (block 120) including the current object/objects added. for Using the Partition elimination (as show in FIGS. 8 and 9) component (block 116), for each object in the SQL query, validate if the partition elimination is achieved in the most optimal way and also validate if the partition elimination conditions which are missing can be applied based on the partition elimination conditions applied on any of the objects the current object joins to. Add other objects (which are not already processed) to current version of the query along with applicable join, where, group by, qualify clauses.

Referring again to the "Reference query 1" mentioned in the initial section of this document, the Reference Query 1 contains 4 database objects listed below:

trandb.billing_transaction_v
trandb.ar_ledger_v
trandb.address_master_v
trandb.fiscal_calendar_v In this iterative approach, the objects are picked up (block 115) for processing in the order they appear in the query.

Iteration 1:

In the first iteration first 2 objects are considered as below.

trandb.billing_transaction_v
trandb.ar_ledger_v

Query Built for these Objects is:

Select biltran.transaction_id, arsl.sub_ledger_no, biltran.transaction_amount, biltran.total_quantity,
From trandb.billing_transaction_v biltran
Inner join trandb.ar_ledger_v arsl
On biltran.ar_ledger_no=arsl.ar_ledger_no
And biltran.transaction_date=arsl.ledger_date
Join trandb.fiscal_calendar_v fcal
On biltran.transaction_date between fcal.fiscal_month_start_date and fcal.fiscal_month_end_date
Where fcal.fiscal_date=current_date;

Note that the object trandb.fiscal_calendar_v has also been included while building the query for the obejcts trandb.billing_transaction_v and trandb.ar_ledger_v. This is because the query build procedure is smart enough to identify that that the join to the object trandb.fiscal_calendar_v is needed for partition elimination (block 116). So, in this first iteration, 3 objects are considered. The tuning process stats for all 3 objects and the following query is the output of the performance tuning.

Select biltran.transaction_id, arsl.sub_ledger_no, biltran.transaction_amount, biltran.total_quantity,
From trandb.billing_transaction_v biltran
Inner join trandb.ar_ledger_v arsl
On biltran.ar_ledger_no=arsl.ar_ledger_no
And biltran.transaction_date=arsl.ledger_date
Join trandb.fiscal_calendar_v fcal
On biltran.transaction_date between fcal.fiscal_month_start_date and fcal.fiscal_month_end_date
And arsl.ledger_date between fcal.fiscal_month_start_date and fcal.fiscal_month_end_date
Where fcal.fiscal_date=current_date;

Iteration 2:

In this iteration, the next object trandb.address_master_v is considered for tuning.

Note that the tuned query output from previous iteration is used in this iteration.

The query build process builds the query as shown below and starts the tuning process on this version of the query:

Select biltran.transaction_id, arsl.sub_ledger_no, biltran.transaction_amount, biltran.total_quantity,
Adrs.address_group
From trandb.billing_transaction_v biltran
Inner join trandb.ar_ledger_v arsl
On biltran.ar_ledger_no=arsl.ar_ledger_no
And biltran.transaction_date=arsl.ledger_date
Inner join trandb.address_master_v adrs
on biltran.transaction_location_id=adrs.location_id
Join trandb.fiscal_calendar_v fcal
On biltran.transaction_date between fcal.fiscal_month_start_date and fcal.fiscal_month_end_date
And arsl.ledger_date between fcal.fiscal_month_start_date and fcal.fiscal_month_end_date
Where fcal.fiscal_date=current_date;

Since all 4 objects have been processed, there are no more iterations needed for this query.

Rebuild the SQL query (block 120) for the objects extracted so far.

Execute the SQL query built in previous step using Execution and Track component and validate the performance numbers (block 195). If the performance numbers are within the acceptable limits as given by the configuration then further analysis is not needed and the SQL query built so far can be considered tuned. If all objects of the query are not yet considered, then the process can start from block 115. If the performance numbers are not within the acceptable limits as given by the configuration then further analysis is needed and the next steps should be executed.

Distribution is a key aspect on any MPP platform. Using the Distribution component (block 180) evaluate the distribution configuration issues and fix them as needed for each object involved in the SQL query. If any distribution configuration changes are implemented (determination of distribution fix in block 130), using the Statistics component (block 125), extract the missing statistics needed for the SQL query built so far. If any statistics were collected based on the output from Statistics component, execute the query SQL query using Execution and Track component (block 195) and validate the performance numbers. If the performance numbers are within the acceptable limits as given by the configuration then further analysis is not needed and the SQL query built so far can be considered tuned and the process can start from block 115. If the performance numbers are not within the acceptable limits as given by the configuration further analysis is needed and the next steps should be executed.

If any changes are implemented in above step and the changes negatively impacted the performance, then undo (block 165) the changes implemented in previous step by rolling back the distribution configuration changes. If the distribution configuration changes implemented have not negatively impacted statistics, then track (block 182) the distribution configuration changes as a required step for tuning the SQL query.

Using Alternate Access Path (as show in FIG. 10) component (block 175), validate if an alternate access path needs to be implemented and/or optimized and implement the changes as needed. If any changes were implemented (block 140) by the Alternate Access Path configuration, using the Statistics component (block 125), extract the missing statistics needed for the SQL query built so far. If any statistics were collected based on the output from Statistics component, execute the query SQL query using Execution and Track component (block 195) and validate the performance numbers. If the performance numbers are within the acceptable limits as given by the configuration then further analysis is not needed and the SQL query built so far can be considered tuned and the process can start from block 115. If the performance numbers are not within the acceptable limits as given by the configuration then further analysis is needed and the next steps should be executed.

If any changes are implemented in above step and the changes negatively impacted the performance, then undo (block 165) the changes implemented in previous step by rolling back the changes implemented to optimize alternate access path. If the alternate access path changes implemented have positively impacted the SQL query, then track (block 182) the alternate access path changes as a required step for tuning the SQL query.

Using Skew (as show in FIGS. 6 and 7) analysis component (block 170), validate if skew exists and if it is not within the acceptable range as per the user configuration then fix the skew issue using Grouping component. If a skew fix was applied, (as determined in block 155), extract the additional statistics needed (block 125). Below figures show the data distribution and data skew scenarios:

Scenario 1 (FIG. 6): (even data distribution scenario)
billing_transaction Table contains 100 rows (for simplicity).
MPP database platform contains 5 data processing nodes
Distribution configuration of the billing_transaction table is based on the column transaction_id.
Data in Transaction_id column has high cardinality which means it can result in even data distribution.
For this scenario, the data distribution looks as below. In any MPP database platform, even distribution of data is important to ensure optimal parallel processing of data.

Scenario 2 (FIG. 7): (data skew scenario)
billing_transaction Table contains 100 rows (for simplicity).
MPP database platform contains 5 data processing nodes
Distribution configuration of the billing_transaction table is based on the column transaction_location_id.
Data in transaction_location_id column has low cardinality which means it can result in very uneven data distribution.
For this scenario, the data distribution looks as below. In any MPP database platform, even distribution of data is important to ensure optimal parallel processing of data.

FIG. 7 shows that the data is unevenly distributed. Node 3 is hosting 75% of the data. This is a data skew scenario. In such scenarios, while processing data, Node 3 will have to process 75% of data which results in inefficient parallel processing.

If any changes were implemented by the Grouping configuration, using the Statistics component (block 125), extract the missing statistics needed for the SQL query built so far. If any statistics were collected based on the output from Statistics component, execute the query SQL query using Execution and Track component (block 195) and validate the performance numbers. If the performance numbers are within the acceptable limits as given by the configuration then further analysis is not needed and the SQL query built so far can be considered tuned and the process can start from block 115. If the performance numbers are not within the acceptable limits as given by the configuration then further analysis is needed and the next steps should be executed.

If any changes are implemented in above step and the changes negatively impacted the performance, then undo (block 165) the changes implemented in previous step by rolling back the changes implemented to minimize processing skew. If the changes implemented to minimize skew have positively impacted performance, then track (block 182) the alternate access path changes as a required step for tuning the SQL query.

Step 21: Repeat from block 115 to block 190 for each object in the SQL query.

Step 22: After all the above steps are completed, the SQL query will be a state where:

All the objects in the SQL query would have appropriate statistics defined

All the objects will have appropriate distribution confirmation.

The skew in the query would be optimized.

Appropriate alternate access paths would be optimized.

Better partition elimination would be achieved in the query.

With all the above changes done, the SQL queries would be in an optimally tuned state.

The list of changes needed to be done to get the SQL query to the tuned state are available through the changes tracked after each step.

Figure 3:
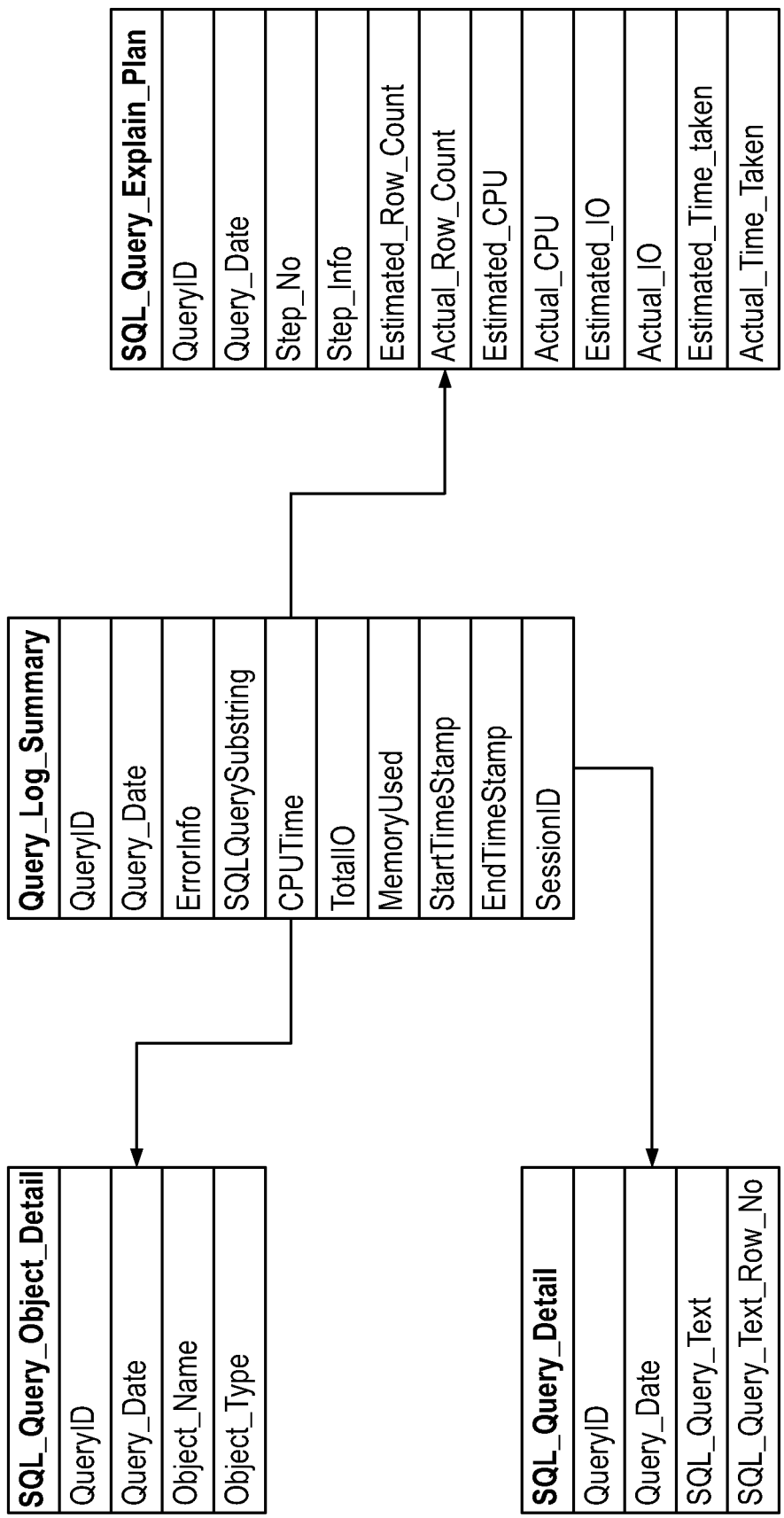
FIG. 3 is a sample query log according to embodiments.

A Sample Query Log is shown in FIG. 3.

Example Input needed:

Pointer to the query log for the query: As mentioned in the pre-requisite description, this pointer will depend on implementation of the query log. For example: In Teradata, the pointer consists of a QueryID, LogDate and ProcID. The combination of these 3 values provides a reference to the query and its details in the query log.

Performance tuning configuration: Based on the configuration of database platform, the acceptable ranges of performance numbers (CPU, IO, Memory) need to be provided through the Configuration component. Appendix II contains a list of parameters which can act as performance tuning configuration.

APPENDIX I

Configuration Component

One objective of the subject disclosure is to automate a complete performance tuning process of any SQL query on MPP database platforms. As will be understood, there may be many inputs needed at various stages of performance tuning to help in making decisions on what tuning techniques are applicable, what performance numbers can be considered to be within the acceptable range, etc.

There are many such scenarios where such inputs are needed. A configuration component should be used to provide all such inputs. A list of inputs which may be used to performance tune a SQL query is given in Appendix II.

A simple and efficient implementation of this is to provide values for all configuration parameters in a text file following any standard format or by hosting the configuration parameters and their values in a database table in the repository.

Since the values of parameters provided are used at many stages of the performance tuning process, the tuning configuration values can alter the execution of the process itself.

Replication Component

In some embodiments, the replication component may be used only once. It may be called before starting any of the performance tuning steps.

For each of the objects (tables and views) identified (including its full object), extract the
Definition of the object (also referred to as DDL)
Statistics applied
Indices related to the object After extracting the above-mentioned detail on any given object, perform the following steps.

Re-point the object's DDL to point to the sandbox database. Sandbox database information is provided through the tuning configuration.

If the object is a table, execute the re-pointed DDL (as show in FIG. 4). This creates the object in the sandbox database. If the object is a view, validate if the view is built on multiple tables. If it is, then validate if all required objects are already created in the sandbox or not, if not, delay the view creation until all required objects are recreated in the sandbox database.

After each object's creation, check for objects which have been delayed creation due to availability of dependent objects and create it in the sandbox database if all its dependencies have been met.

If the object is a table, build an insert statement to extract data from the original table into the table created in previous step and execute the statement. This step populates the table with required data.

If the object is a table, re-point collect statistics statements to apply on the table created in Step 1 and execute the collect statistics.

If the object is a table, re-point the indices to point to the table created on Step 1 and execute the index syntax to create the indices in the sandbox database. If the index is built on multiple tables, then validate if all required tables are created in the sandbox and then create the index.

The following are the results of this component:

All objects along with their data, indices, statistics and views are replicated in the sandbox database.

The query is re-pointed to refer to the objects in the sandbox database.

Statistics Component:

In all MPP database platforms there is an implementation of query optimizer which may be responsible for building an execution plan (generally referred to as explain plan) for any given SQL query. This execution plan provides details on how the data needs to be processed to get the desired output of the SQL query.

The following is a sample explain plan based on a hypothetical query. The Explain plan may be database platform specific. Each database platform may create the explain plan differently.

Example Query:
Select biltran.transaction_id, coalesce(arsl.sub_ledger_no,−1) sub_ledger_no als
From trandb.billing_transaction_v biltran
Inner join transb.ar_ledger_v arsl
On biltran.ar_ledger_no=arsl.ar_ledger_no
And biltran.transaction_date=arsl.ledger_date Assumptions:
Distribution configuration of table trandb.billing_transaction is based on transaction_id.
Distribution configuration of table trandb.ar_ledger table is based on ar_ledger_no and ledger_date.

Explain Plan for Above Query:
Extract all rows of trandb.billing_transaction table with no residue conditions
Distribute extracted data from trandb.billing_transaction table based on ar_ledger_no and transaction_date columns
Extract all rows of trandb.ar_ledger table with no residue conditions
Join distributed data from trandb.billing_transaction table with trandb.ar_ledger table using nested loop join
Store the results in new memory location and return to user In above explain plan, the table trandb.Billing_transaction is distributed on ar_ledger_no and transaction_date because current distribution configuration indicates that this table is distributed on transaction_id. So, current distribution configuration does not match with the join path. Join path in the query for this table is based on ar_ledger_no and transaction_date columns. Table trandb.ar_ledger is not distributed because it's distribution configuration (columns ar_ledger_no, ledger_date) matches with the join path used in the query (i.e. this table is joined based on ar_ledger_no and ledger_date columns).

To generate this explain plan, the optimizer depends on the statistics (as show in FIG. 5) collected on the tables. Appropriate statistics collected on the database objects involved in the query results in a more accurate plan. Hence, object statistics play a vital role in generating optimal execution plans.

An SQL query is given as the input to the Statistics component. For the given SQL query, following steps are performed.

Some MPP database platforms provide inbuilt functionality to identify required statistics needed for the query. Use this feature to extract the missing statistics.

If the database platform does provide inbuilt functionality to identify required statistics, for example: in Teradata, the inbuilt functionality provides required statics in few categories (High confidence, Medium confidence, Low confidence, no confidence). In such scenarios, statistics can be collected by category and after each category of statistics are collected, execute the SQL query using Execution and Track component and validate the performance numbers. If the performance numbers are positively impacted then track the collect statistics are needed for tuning the SQL query. If the performance numbers are negatively impacted then undo the collected statistics.

If the database platform does not provide built-in functionality to identify required statistics, perform following steps.

Extract the objects involved in the latest join condition
Through the object lineage, identify the underlying tables for the join objects identified in above step.
For each join object, extract the join columns in the Lineage component for each object involved in the latest join condition.
Through the column lineage in the Lineage component, identify the actual underlying columns of the tables.
For each table identified, validate if the table has the statistics collected on the join columns. If the required statistics are missing, then build the collect statistics statement and execute it to collect the statistics.

In some database platforms, additional analysis is needed to collect accurate statistics. For example: In Teradata platform, by default, only the first 24 bytes of each value in the column are considered while collecting statistics. In some scenarios, where the uniqueness of the values start from the 25th character, the collect statistic command need to explicitly mention that. The statistics component performs analysis on such scenarios and performs the required analysis to get more accurate statistics.

The result of this component is a list of statistics applied on the objects.

Grouping Component:

This component takes an SQL query as an input.

Referring now to FIGS. 11 and 12, a Grouping component helps in splitting the SQL query into 2 parts which help to achieve following goals:

Apply grouping clause on one or both of the split parts to remove skew.

One or both parts of the split query can be materialized into a database table (with required distribution configuration and statistics) can improve performance significantly. Materialization is particularly required when working with big data sets (millions of rows). Depending on the MPP database platform, the type of materialization can also be chosen. For example: In Teradata, one can create a session specific volatile table or a regular table.

The result of this component is a query which is split into 2 parts. One or both paths could be materialized or a sub query. Entire query would be re defined to refer to these 2 parts as shown in FIGS. 11 and 12.

Partition Elimination Component

When working with big tables, it may be desirable to eliminate scanning all rows (also referred to as full table scans). It is desirable to be able to identify the rows needed for the query by scanning only a subset of the rows in the table. This desired functionality is achieved through partitioning as shown in FIGS. 8 and 9 according to an exemplary embodiment. A partitioning process may be performed by:

For tables which are big (based on user configuration), identify if the table is partitioned. Partitioning elimination is considered as achieved if any of the following is true:

If there is static condition on partitioning column in the where clause or join condition.

If there is an IN clause with static values or a sub query on partitioning column in the where clause or join conditions.

If the partitioning column is used in a join and the join to object is used to eliminate partitions.

If the table is partitioned but none of the above conditions are true and the partitioning columns is used in joins to other objects and the join is an equi join or a right outer join (the object being analyzed being on the left side) or a left outer join (the object being analyzed being on the right side), perform following steps:

Extract the object the table is joined to on the partitioning column.

Check if any of the following conditions are true

If there is static condition on partitioning column in the where clause or join condition.

If there is an IN clause with static values or a subquery on partitioning column in the where clause or join conditions.

If the partitioning column is used in a join and the join to object is used to eliminate partitions.

If any of the above conditions are true, then extract that condition/join and apply the same condition to the object being analyzed on the partitioning column which is used in the join.

If none of the conditions mentioned immediately above are true, then iteratively repeat the steps to iteratively look at any joined table's partition elimination can be leveraged.

The result of this component is one or more conditions which will help achieve partition elimination as optimally as possible.

Lineage Component

This component takes input as:

For column lineage—Column name and the object to which it belongs to.

For object lineage—object information

In many scenarios, there is a need to extract lineage at column and table level. Some of these scenarios are listed below:

To identify changes (calculations, functions used) done to the column across the dependent views or sub queries.

To identify changes underlying physical column name or table name

To identify the dependencies between views

The Parsing component extracts lineage of each of the objects (including all aspects of the SQLs like select list, joins, etc.) used in the SQL query and hosts it in the repository. Lineage component uses this information to extract the lineage of objects and columns.

Figure 14:
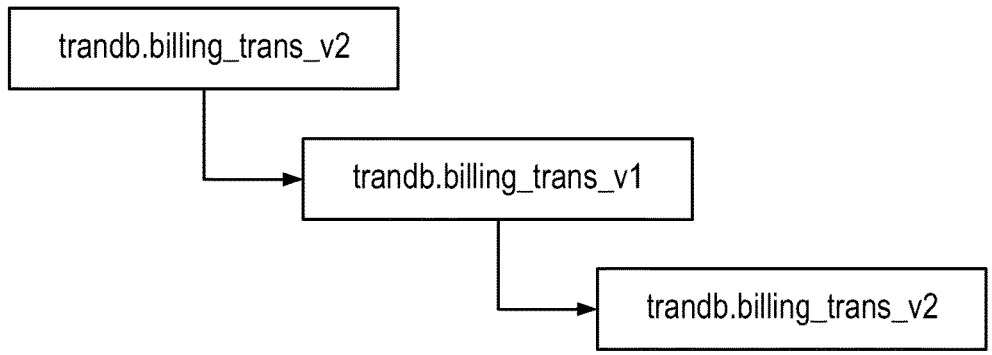
FIG. 14 is a diagrammatic view of an object lineage in accordance with an exemplary embodiment of the subject technology.
Figure 15:
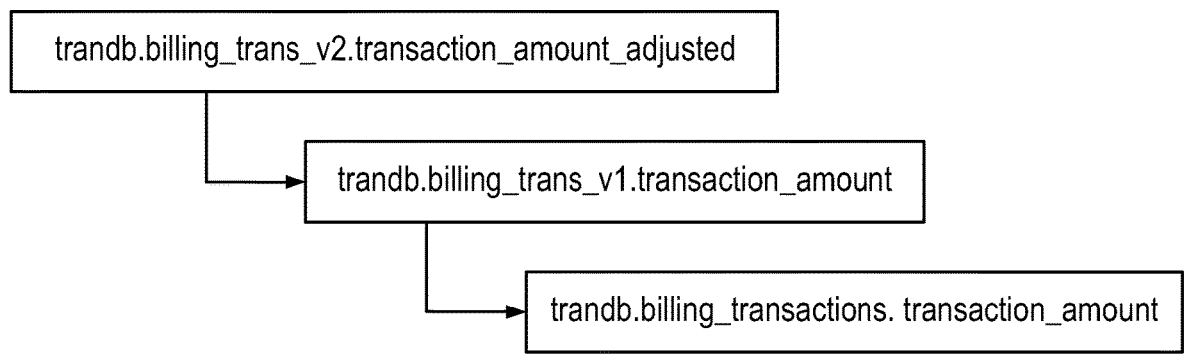
FIG. 15 is a diagrammatic view of a columns lineage for the object lineage shown in FIG. 14 in accordance with an exemplary embodiment of the subject technology

Referring to FIGS. 14 and 15 and the following query of object and column lineage, the result of this component is one of the following:

For column lineage—Physical column name and the associated table name.

For object lineage—Physical table name

The below SQL shows the relation between a base table and 2 views.

Create view trandb.billing_trans_v2 As

Select transaction_id, sub_ledger_no, transaction_amount*100 transaction_amount_adjusted, total_quantity, trans_date From trandb.billing_trans_v1;

Create view trandb.billing_trans_v1

As

Select transaction_id, sub_ledger_no, transaction_amount, total_quantity, trans_date From trandb.billing_transactions;

Create table trandb.billing_transactions (

Transaction_id bigint,

Sub_ledger_no_bigint,

Transaction_amount decimal(20,3),

Total_quantity decimal(20,3),

Trans_date date)

)

For the above scenario of objects, the object lineage will be as shown in FIG. 14.

For the columns lineage for the column transaction_amount_adjusted in the view trandb.billing_trans_v2 is as shown in FIG. 15.

Parsing Component:

This component takes a SQL query as input.

Referring back to the section on the parsing step above, the following steps are performed in this component:

Step 1: Extract all objects (tables, views, sub queries) used in the query and host it in the repository.

Step 2: Parse the select list, join conditions, where conditions, group by clauses, order by clauses, qualify clauses and host the details in the repository.

Step 3: For each object identified in the Step 1,

If the object is a sub query, repeat Step 2.

If the object is a view, lookup the view in the database to get it's SQL text and repeat Steps 1 to 3 for this SQL text. If the view is not found in the database, then using Session objects component, extract the view's SQL text and repeat Steps 1 to 3 for this SQL text.

If the object is a table, then host it in the repository.

Store all information in the repository.

Result of this component is to lineage of each object and column is stored in the repository along with details on each SQL parsed.

Session Objects Component:

It is common for processes which manipulate data to create database objects, populate data in them and use them in SQL queries and drop them when they are not needed anymore.

Such objects are normally session specific. This means, they exist only in the session they are created. This is possible only if the session information is tacked in the query logs in the. If a SQL query being tuned uses one of the session specific objects, the tuning process will not find the details of the object in the database metadata tables. To identify the SQL text of such objects, the following steps may be performed.

Step 1: Extract the SQL query's user session information. Session information normally consists of a session id.

Step 2: Look back in the query log and extract all objects created during that session id and host it in the repository.

Result of this component is SQL text of all objects created in the session.

Execution and Track Component:

This component may execute the given SQL statement and check capture the performance numbers.

Input to this component is a SQL statement.

The following steps may be performed for any given SQL statement:

Step 1: In some MPP database platforms like Teradata, key and value pairs can be tagged for SQL statements executed. If such a feature is provided by the database platform, build a unique key and value pair (as shown in FIGS. 8 and 9) combination statement and execute it successfully. Any SQL statements executed from now on in the same session will be tagged with the set key and value pair. This is useful to identify the SQL statements executed.

Step 2: If the key and value pair is set in Step 1, in the same user session execute the given SQL statement successfully. If the key and value pair is not set in Step 1, execute the given SQL statement successfully.

Step 3: If the key and value pair is set in Step 1, look in the database logs continuously at regular intervals until the executed SQL statement is found tagged to the key and value pair. If the key and value pair is not set in Step 1, look in the database logs continuously at regular intervals until the executed SQL statement is found. In this scenario, the search will be based on the SQL text.

Step 4: Once the SQL statement is found, extract the performance numbers associated. Host the numbers along with the SQL query executed in the repository.

Step 5: Validate if the performance numbers against the tuning configuration provided by user. If the numbers are within the acceptable range then the query can be considered tuned else, additional analysis is needed to tune the query.

The result of this component will be the output of the query execution along with errors and performance numbers associated with the execution.

Alternate Access Path Component:

This component takes one table as input at a time.

The following steps may be performed for alternate access path analysis for one database table.

Step 1: Identify all views dependent on the given database table.

Step 2: From the database logs, extract all queries executed involving any of the identified views or the table itself.

Step 3: For each query, identify which object/objects used from list of objects identified in above step.

Step 4: For the object identified in above step, extract the columns of the object used in joins in the SQL query. While extracting the columns, for each column identified, extract the column's lineage (from the object to the given table). The lineage is used to identify any manipulations done on the column (including renaming of column).

Step 5: Track the combinations of columns identified in above step and also count the number of occurrences of each combination.

Step 6: repeat Step 3 to Step 5 for each query identified.

The result of the Step 6 will be a list of all possible access paths (as shown in FIG. 10) for the given object.

Repository Structure:

This section provides details on the backend database repository for the automated performance tuning method in accordance with embodiments of the subject technology. The automated performance tuning process may need to perform many steps (like parsing, executing, collecting performance data for each execution, replication, access path analysis, etc.) on the SQL query to be tuned. The backend repository is used to host required data which is collected throughout the process of tuning.

Below are the tables which may be used to host various types of information per query.

This design enables to host the required metadata about SQL in a format which enables the process to piece meal the SQL query and extract any aspect of the information needed about the SQL query.

| Table Name | Description |
| --- | --- |
| ats_tbls | Contains the objects involved in the SQL query. This table contains objects organized in hierarchicaly. Data in this table can be used to extract object lineage all the way to the base tables (including session created objects etc . . . ). |
| ats_tbls_lefnds | Contains the base tables invovled per object used in the SQL query. |
| ats_sesncrtd_obj_tbl | Contains the list of objects created it the session associated with the SQL query to be tuned. |
| ats_mstr_sqlist | List of queries in the SQL being tuned. |
| ats_qry_confgrtn | Contains the configuration (key value pairs) which govern the tuning process decisions and actions. |

-continued

| Table Name | Description |
|---|---|
| ats_stats_recmdtn | Contains the statistics recommendations for tuning the query. |
| ats_replctn_obj_track | Contains the mapping between the objects in the SQL query and their replicated counter parts. |
| ats_replctd_objcts | Contains the objects which were replicated |
| ats_replctd_objcts_statidx | Cotains the statistics and index information of all objects invovled in the SQL query. |
| ats_sel_list_dtl | It contains select list items (one row per select list item). |
| ats_sel_list_oprnd_dtl | It contains columns invovled in each select list item in ats_sel_list_dtl table. |
| ats_joins_tbl | Contains the join conditions information in the SQL query. The join conditions in this table is same as the seen in the SQL query. Each row in this table will contain a full join condition (which could contians multiple conditions). |
| ats_joins_dtl | Contains the join and where caluses info. In this table, each condition will be in a separate row by itself. |
| ats_join_oprnd_objct_dtl | Contains the columns invoked in each join condition given in ats_joins_dtl table |
| ats_grphvngqlfy | Details of group by, having and qualify clause as they appear in the SQL query. |
| ats_grphvngqlfy_dtl | Details of group by, having and qualify clause with further detail than they appear in the SQL query. |
| ats_grphvngqlfy_oprnd_dtl | Cotains the columns involved in each of the Group by, Having and Qualify clauses in the SQL query |
| ats_tuned_sqlist | Contains the final tuned state of the SQL. |
| ats_run_log | Contains the log of the SQL tuning activities. This log provides details on all actions and decisions taken by the SQL tuning process. |
| ats_run_status | Tuning process contains multiple phases. This table contains the stautus of each of the phases of the Tuning process. This information is used by the tuning process to skip the tasks/actions already performed. |
| ats_perfnos_qry | Throughout the process of perfomance tuning, the tuning process executes the SQL query at various stages and collects performance information of the query. This table is used to track such queries at each execution. The log entries in ats run log table will have a pointer to data in this table. |
| ats_obj_profl | Contains the profile information per object. Profile information include, data distirbution configuration , size of the table, partitioning information of the table etc . . . |
| ats_tuning_steps | Contains the sequence of steps to be perfomed to tune the SQL statement |
| ats_demrphc_info | Throughout the process of perfomance tuning, the tuning process collects data demographic information for each iteration of query change. Data demographic information include no. of rows, data skew information etc . . . This table is used to track the data demographic information at each iterataion . The log entries in ats_run_log table will have a pointer to data in this table. |
| ats_perfnos | Throughout the process of perfomance tuning, the tuning process executes the SQL query at various stages and collects performance information of the query. This table is used to track the performance information at each execution. The log entries in ats_run_log table will have a pointer to data in this table. |
| ats_col_lineg | Contains the lineage of all columns. |
| ats_pi_mstr_sqlist | List of queries in the SQL being analzed for join paths |
| ats_pi_sel_list_dtl | This table is used for only the join path analysis. It contains select list items (one row per select list item). |
| ats_pi_sel_list_oprnd_dtl | This table is used for only the join path analysis. It contains columns invovled in each select list item in ats_pi_sel_list_dtl table. |
| ats_pi_sesncrtd_obj_tbl | This table is used for only the join path analysis. |
| ats_obj_pi_anlys | This table is used for only the join path analysis. |
| ats_obj_pi_anlys_output | This table is used for only the join path analysis. |
| ats_obj_pi_anlys_sumry | This table is used for only the join path analysis. |
| ats_pi_tbls | This table is used for only the join path analysis. |
| ats_pi_joins_dtl | This table is used for only the join path analysis. |
| ats_pi_joins_tbl | This table is used for only the join path analysis. |
| ats_pi_join_oprnd_objct_dtl | This table is used for only the join path analysis. |
| ats_pi_tbls_lefnds | This table is used for only the join path analysis. |
| ats_pi_depndnt_objcts | This table is used for only the join path analysis. |

Below are the master tables which contains information which is shared by all aueries.

TABLE 3

| Table Name | Description |
|---|---|
| admn_usr_lst | Contain user created who can |
| ats_mastr_atn_status | Contains distinct list of status which apply throughout the tuning cycle of an SQL query |

TABLE 3-continued

| Table Name | Description |
|---|---|
| ats_mastr_confgrtn | Contains the key value pairs which act as master configuration for everything related to query tuning. When a new query is added to the tuning list, this configuration comes into effect. The user can over ride this confiruration for the query. Updated configuration will be applied only for tuninf of that particular query. |
| ats_obj_pi_anlys | Contains performance details, query detials which are extracted to analyze the access paths of an object. |
| ats_obj_pi_anlys_output | Contains the analyzed output of each query in ats_obj_pi_anlys table |
| ats_obj_pi_anlys_sumry | Contains the summarized information of the access path anayslsis in ats_obj_pi_anlys output table. |
| ats_tuning_summary | Contains consoidated information on the queries tuned along with the user and the CPU, IO and time saved. |
| mstrqrytbl | Contains the master list of all queries which need to be tuned. |
| qry_asgnmt_trck | Each query in mstrqrytbl can be assgned to users in admn_usr_1st table. This table contians the assignement details. |
| ats_replctn_restrctn | Contains the where clauses to be applied to big tables which replicating |

APPENDIX II

TABLE 4

| List of Inputs | | |
|---|---|---|
| Confgtn_key | Confgtn_Value | Confgtn_Value_Metrc |
| SandboxDBName | sandboxdb | String |
| PDCRViewDB | PDCRINFO | String-QueryLogViewDB |
| PDCRLogTbl | dbqlogtbl | String |
| PDCRSqlTbl | dbqlsqltbl | String |
| PDCRObjTbl | dbqlobjtbl | String |
| Query TimeoutonTargetSystem | 120 | secs |
| IOWaitLimit | 40 | % |
| ReplicateMaxTableSize | 500 | GB |
| CPUskewPercentage | 50 | % |
| IOskewPercent | 50 | % |
| runtime | 10 | Minutes |
| CPU | 25000 | Integer Value |
| ImpactCPU | 25000 | Integer Value |
| IO | 5000000 | Integer Value |
| ImpactIO | 5000000 | Integer Value |
| spool | 1000000000 | Integer Value |
| ObjectsRecreateInd | 1 | Integer Value |
| JoinPathExtractTimeFrame | 15 | days |
| PIAnalysisTimeFrame | 15 | days |
| PIDataStaleDays | 100 | days |
| QueryTimeoutonAllTargetSystem | 120 | secs |
| Min_Table_for_Indx | 10.00 | GB |
| TableBlockSize | 127.00 | KB |
| % Usage for acess path for JI analysis | 30.00 | % |
| Dpe_Small_Table_Size | 0.00 | GB |
| Advanced Dpe Enabled | 1.00 | 1 (enabled)/0 (disabled) |
| Skew_Fix_Min_Skew_Percent | 0.00 | % |
| Skew_Fix_Min_Impactcpu | 0.00 | Integer Value |
| Skew_Fix_Min_Impactio | 0.00 | Integer Value |
| Skew_Fix_Groupby_Max_Rows | 0.00 | Integer Value |
| Skew_Fix_Materialize_Min_Rows | 0.00 | Integer Value |
| Pi_Fix_Min_Impactcpu | 0.00 | Integer Value |
| Pi_Fix_Min_Impactio | 0.00 | Integer Value |
| Pi_Fix_Min_Spool | 0.00 | Integer Value |
| Pi_Fix_PI_Use_Percent_To_Change | 0.00 | Integer Value |
| Materialize_Min_Impactcpu | 0.00 | Integer Value |
| Materialize_Min_Impactio | 0.00 | Integer Value |
| Materialize_Min_Rowcount | 0.00 | Integer Value |
| Ji_Fix_Min_Tables_Sizes | 0.00 | GB |
| Ji_Fix_Both_Tables_Big_Ind | 0.00 | 1 or 0 |
| Impact_CPU_Technique_Keep_percent | 0.00 | Percentage |
| Impact_IO_Technique_Keep_percent | 0.00 | Percentage |
| pi_fix_enabled | 0.00 | 1 (enabled)/0 (disabled) |
| skew_fix_bygroupby_enabled | 1.00 | 1 (enabled)/0 (disabled) |
| skew_fix_bytable_enabled | 1.00 | 1 (enabled)/0 (disabled) |
| skew_fix_byvt_enabled | 1.00 | 1 (enabled)/0 (disabled) |
| JI_fix_enabled | 1.00 | 1 (enabled)/0 (disabled) |
| small_tbl_max_gb | 0.00 | GB |
| medium_tbl_max_gb | 0.00 | GB |
| large_tbl_max_gb | 0.00 | GB |

TABLE 4-continued

| List of Inputs | | |
|---|---|---|
| GetBaseLinePerfBeforeTuning | 1.00 | 1 (enabled)/0 (disabled) |
| rollback_highconf_stats | 1.00 | 1 (enabled)/0 (disabled) |
| MaxConcurrentQuries | 1.00 | 1 to 10 |

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

As will be appreciated by one skilled in the art, aspects of the disclosed invention may be embodied as an apparatus, a system, a method or process, a circuit, a module, or a computer program product. Accordingly, aspects of the disclosed invention may take the form of an entirely hardware embodiment, an entirely software embodiment (including firmware, resident software, micro-code, etc.) or an embodiment combining software and hardware aspects that may all generally be referred to herein as a "module", "circuit", or "system." For example, some of the elements disclosed above were referred to as a "controller" which may take the form of a circuit of various electronic elements, an integrated circuit, a system on a chip (SoC), an application specific integrated circuit (ASIC), a standalone processor, microchip, or microcontroller unit or any combination of the aforementioned. Furthermore, aspects of the disclosed invention may take the form of a computer program product embodied in one or more computer readable media having computer readable program code embodied thereon.

The computer system readable media may be performed on a computing device (not shown). The system memory for a computing device may include at least one program product having a set of program modules that are configured to carry out the functions and/or methodologies of embodiments of the invention as described above, for example those described with respect to FIG. 1 and related passages.

Aspects of the disclosed invention are described below with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of improving the performance of SQL query statements in a database platform, comprising: receiving an original SQL query statement, wherein the original query statement includes multiple SQL objects and one or more logic functions; replicating the received original SQL query statement in an isolated database environment; parsing by the computer processor, the replicated SQL query statement into query elements, wherein the query elements comprise instances of the SQL objects and logic functions; extracting by the computer processor, in the isolated database environment, individual query elements from the parsed query elements; selecting by the computer processor, in the isolated database environment, a base one of the extracted individual query elements, wherein the base one of the extracted individual query elements is one of the SQL objects; building by the computer processor, in the isolated database environment, a first query under test starting from the selected base one of the extracted individual query elements and using a minimal combination of the extracted individual query elements to form a starting functional query statement that is a base partial form of the original SQL query statement; creating new objects in the isolated database environment; testing a first performance of the starting functional query in the isolated database environment, adding a first additional extracted individual query element to the starting functional query statement to form a second query under test; changing a structure of one of the SQL objects in the second query under test; testing a second performance of the second query under test that includes the first additional extracted individual query element; determining whether the second performance is within an improved performance; rolling back the second query under test to the first query under test in the event the second performance is not within the improved performance; successively adding by the computer processor in the isolated database environment, one or more additional ones of the individual query elements to the first query under test in iterations including combined successively added individual query elements; and testing the first query under test for a query performance metric after each successive addition of the one or more individual query elements by the computer processor to the first query under test and applying one or more performance tuning corrections until the iterations show improvement in the query performance metric toward a query objective, wherein the performance tuning corrections are selected from one of an SQL change, and an applied statistic.

2. The method of claim 1, wherein the database platform is a Massively Parallel Processing (MPP) platform.

3. The method of claim 1, wherein the query elements also comprise, query commands accompanying the objects when the first query under test is being built.

4. The method of claim 1, further comprising identifying an underlying cause of lower performance in the first query under test after each iteration is tested.

5. The method of claim 4, further comprising fixing the identified underlying cause of lower performance after each iteration.

6. The method of claim 5, further comprising continuing to add successive individual query elements to the first query under test after fixing the identified underlying cause of lower performance.

7. The method of claim 1, further comprising generating a query log if the database platform does not include a query log, and receiving the SQL query statement from the query log.

8. The method of claim 1, further comprising: extracting statistics for the first query under test; adding the extracted statistics to the first query under test; and testing the first query under test with the added extracted statistics for the query performance metric.

9. The method of claim 8, further comprising removing the added extracted statistics from the first query under test in the event the added extracted statistics negatively impacts the query performance metric.

10. A computer program product for improving the performance of SQL query statements in a database platform, the computer program product comprising a non-transitory computer readable storage medium having computer readable program code embodied therewith, the computer readable program code being configured, when executed by a computer processor, to: receive an original SQL query statement, wherein the original query statement includes multiple SQL objects and one or more logic functions; replicate the received original SQL query statement in an isolated database environment; create new objects in the isolated database environment; parse by the computer processor, the replicated SQL query statement into query elements, wherein the query elements comprise instances of the SQL objects and logic functions; extract by the computer processor, in the isolated database environment, individual query elements from the parsed query elements; select by the computer processor, in the isolated database environment, a base one of the extracted individual query elements, wherein the base one of the extracted individual query elements is one of the SQL objects; build by the computer processor, in the isolated database environment, a first query under test starting from the selected base one of the extracted individual query elements and using a minimal combination of the extracted individual query elements to form a starting functional query statement that is a base partial form of the original SQL query statement; test a first performance of the starting functional query in the isolated database environment; add a first additional extracted individual query element to the starting functional query statement to form a second query under test; change a structure of one of the SQL objects in the second query under test; test a second performance of the second query under test that includes the first additional extracted individual query element; determine whether the second performance is within an improved performance; roll back the second query under test to the first query under test in the event the second performance is not within the improved performance; successively add by the computer processor in the isolated database environment, one or more additional ones of the individual query elements to the first query under test in iterations including combined successively added individual query elements; and test the first query under test for a query performance metric after each successive addition of the one or more individual query elements by the computer processor to the first query under test and apply one or more performance tuning corrections until the iterations show improvement in the query performance metric toward a query objective, wherein the performance tuning corrections are selected from one of an SQL change, and an applied statistic.

11. The computer program product of claim 10, wherein the database platform is a Massively Parallel Processing (MPP) platform.

12. The computer program product of claim 10, wherein the query elements also comprise, query commands accompanying the objects when the first query under test is being built.

13. The computer program product of claim 10, further comprising computer readable code configured to: identify an underlying cause of lower performance in the first query under test after each iteration is tested.

14. The computer program product of claim 13, further comprising computer readable code configured to: fix the identified underlying cause of lower performance after each iteration.

15. The computer program product of claim 14, further comprising computer readable code configured to: continue to add successive individual query elements to the first query under test after fixing the identified underlying cause of lower performance.

16. The computer program product of claim 10, further comprising computer readable code configured to: generate a query log if the database platform does not include a query log, and receiving the SQL query statement from the query log.

17. The computer program product of claim 10, further comprising computer readable code configured to: extract statistics for the first query under test; add the extracted statistics to the first query under test; and test the first query under test with the added extracted statistics for the query performance metric.

18. The computer program product of claim 17, further comprising computer readable code configured to: remove the added extracted statistics from the first query under test in the event the added extracted statistics negatively impacts the query performance metric.

* * * * *